Oct. 4, 1960 J. E. WHELAN 2,954,987
TWO-POSITION AIR SUSPENSION CONTROL VALVE
Filed Nov. 28, 1958 2 Sheets-Sheet 1
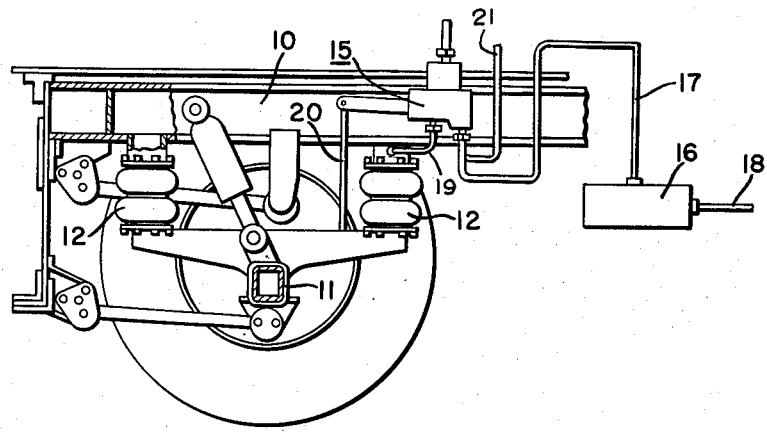
Fig. 1
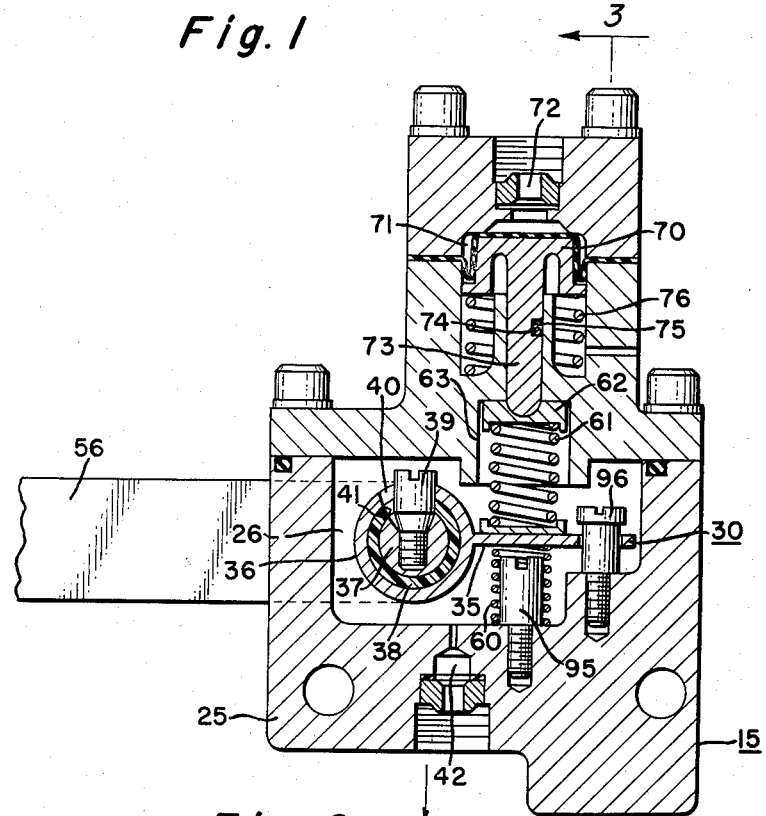
Fig. 2 TO AIR SPRING
INVENTOR.
James E. Whelan
BY
His Attorney

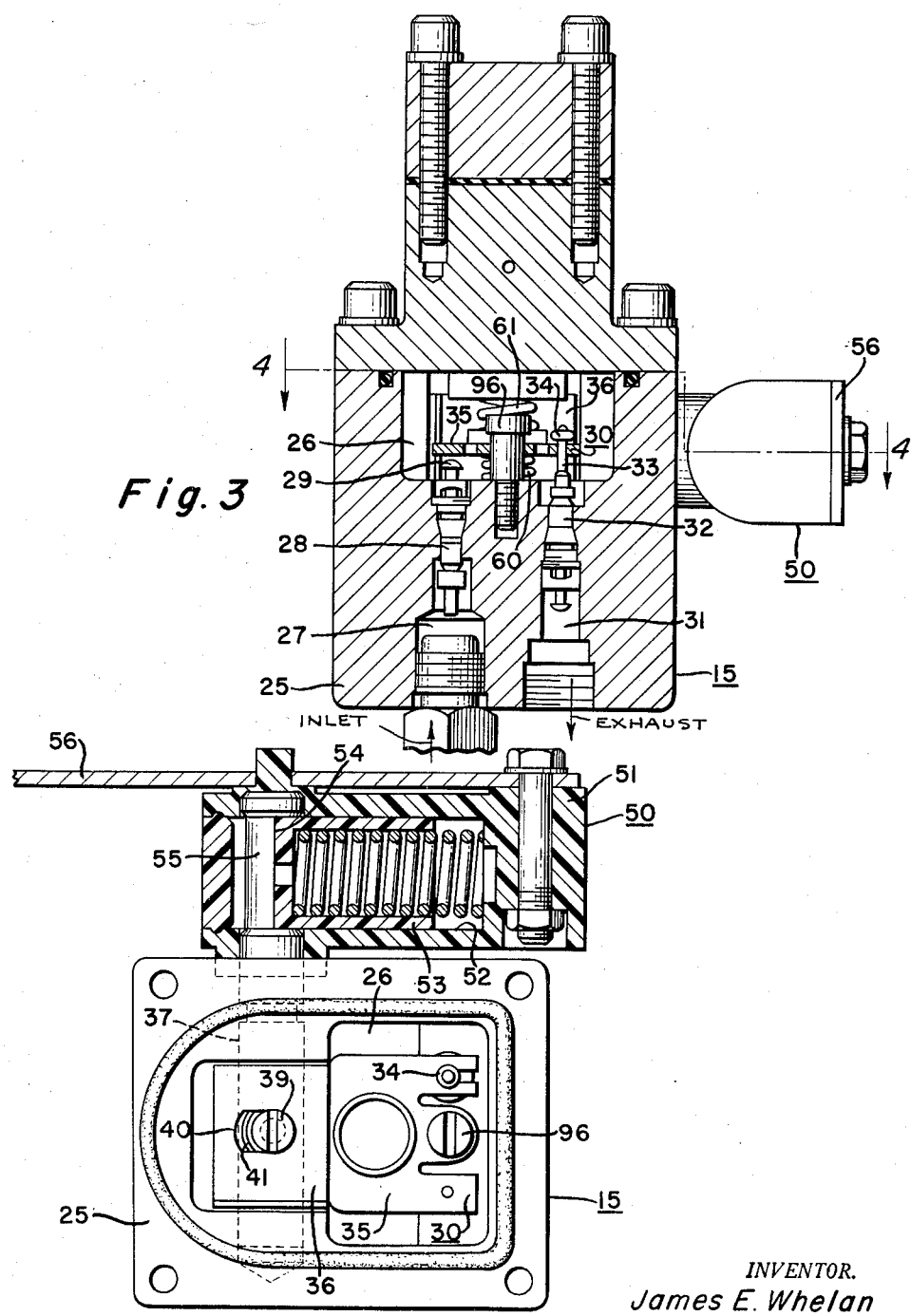

United States Patent Office 2,954,987
Patented Oct. 4, 1960

2,954,987

TWO-POSITION AIR SUSPENSION CONTROL VALVE

James E. Whelan, Dayton, Ohio, assignor to General Motors Corporation, Detroit, Mich., a corporation of Delaware Filed Nov. 28, 1958, Ser. No. 776,906

8 Claims. (Cl. 280—124)

This invention relates to control valves adapted to regulate the supply and exhaust of air to and from an air spring of an air suspension system to regulate the clearance height between the sprung mass and the unsprung mass of a vehicle to establish and maintain a relatively predetermined clearance height between the sprung mass and the unsprung mass.

The use of air springs to replace conventional steel springs between the sprung mass and the unsprung mass of a vehicle to support the chassis and body of the vehicle upon a running gear is now well known in the art. These air springs consist of an expansible chamber that receives air under pressure of a value suitable to support the chassis of a vehicle upon the running gear, utilizing the air of the air spring as the resilient means for supporting the body upon the running gear of the vehicle.

To establish a predetermined clearance height between the sprung mass, that is the body of the vehicle, and the unsprung mass, that is the running gear of the vehicle, the air springs receive air under pressure from a suitable source of pressure supply on the vehicle sufficient to support the load of the body upon the running gear at a predetermined clearance height relative to the running gear.

To maintain the clearance height between the sprung mass and the unsprung mass at a relatively constant value, control valves are provided for regulating the air under pressure to the air springs and exhausting air from the air springs in response to a change in clearance height between the sprung mass and the unsprung mass of the vehicle. These control valves are conventionally carried by the chassis or body of the vehicle with suitable linkage connecting the control valves with the running gear of the vehicle so that internal valve mechanism within the control valve will be actuated upon a change of clearance height between the body and the running gear of the vehicle to supply air to the air springs when the predetermined clearance height is decreased for any reason, such as an increase of load in the body of the vehicle, or loss of air from the air springs. Similarly, the control valves exhaust air from the air springs when the load within the vehicle is decreased, whereby a relatively constant clearance height is established between the chassis of the vehicle and the running gear.

There are conditions, however, under which a predetermined clearance height between the body and running gear of the vehicle is not satisfactory to meet the particular condition, such as when placing the vehicle on a grease rack of an old-style type, or when operating the vehicle over highly crowned or rutted roads. The low road clearance given to modern vehicles creates this problem, which is somewhat amplified by vehicles using air suspension systems because of the tendency to decrease the clearance height between the sprung mass and the unsprung mass of the vehicle when using air suspension, since it is possible with an air suspension system to maintain the clearance height relatively constant under any load condition. This is in distinction from the use of a high clearance height under a light load condition so that there will still be satisfactory clearance height between the sprung mass and the unsprung mass under a fully loaded condition of the vehicle, such as is conventional with the use of ordinary steel springs.

While under ordinary road conditions it is possible to maintain one predetermined clearance height of the vehicle using air spring suspension systems at a relatively low road clearance, yet it is desirable under conditions previously mentioned to be able to increase the clearance height or road clearance of the vehicle, at least temporarily, and operate the vehicle at this increased clearance height until the difficult condition has been avoided or eliminated. It is, therefore, desirable to have a control valve for regulating the supply and exhaust of air to and from an air spring that is capable of establishing and maintaining one predetermined clearance height between the sprung mass and the unsprung mass of a vehicle when operating under normal road conditions, that is road conditions which allow for a relatively low road clearance, and to be able to increase the clearance height or road clearance of the vehicle under adverse road conditions, or when placing the vehicle on a grease rack. Such a temporary increase in clearance height is also desirable when changing a tire in order to lift the body of the vehicle to a height above normal clearance height.

It is, therefore, an object of this invention to provide a control valve for regulating the supply and exhaust of air to and from an air spring of an air suspension system wherein the control valve is constructed and arranged to provide for establishing and maintaining more than one clearance height value between the sprung mass and the unsprung mass of a vehicle so as to increase the road clearance of the vehicle when desired.

It is still another object of the invention to provide a control valve for regulating the supply and exhaust of air to and from an air spring of an air suspension system wherein the control valve is provided with two selective operating positions which establish and maintain two values of predetermined clearance height between the sprung mass and the unsprung mass of the vehicle, the operator of the vehicle having control over the control valve to position it in one or the other of its selective positions and to be able to return the control valve to either of its previous selective positions after being changed from one to the other.

It is another object of the invention to provide a control valve for regulating the supply and exhaust of air to and from the air spring of an air suspension system in accordance with the foregoing objects wherein there is provided an operating device for the inlet and exhaust valve for the control valve which rotates with an actuating member that responds to the clearance height between the sprung mass and the unsprung mass of the vehicle, the operating member for the control valves having two different radial positions relative to the actuating member so that the control valve can be selectively positioned in two effective operating ranges each of which establishes one predetermined clearance height value between the sprung mass and the unsprung mass of the vehicle and maintains that value once it has ben established by the control valve, the positioning of the control valve in either of its selective positions being under control of the operator of the vehicle through manually actuated selective control means.

Further objects and advantages of the present invention will be apparent from the following description, reference being had to the accompanying drawings wherein preferred embodiments of the present invention are clearly shown.

In the drawings:

Fig. 1 is a schematic view of an air suspension system for a motor vehicle incorporating a control valve constructed in accordance with this invention.

Fig. 2 is a transverse cross-sectional view of the control valve illustrating the mechanism for effecting two operating positions of the control valve.

Fig. 3 is a transverse cross-sectional view taken substantially along line 3—3 of Fig. 2 showing the air pressure inlet and exhaust passages and valves of the control valve.

Fig. 4 is a cross-sectional view taken substantially along line 4—4 of Fig. 3 and illustrating an overtravel mechanism for the control valve in cross section.

Fig. 1 illustrates schematically a vehicle incorporating an air suspension system with the sprung mass of the vehicle being supported upon the running gear or axle structure of the vehicle by means of air springs, the air springs being under control or regulation of a control valve adapted to respond to changes in clearance height between the sprung mass and the unsprung mass of the vehicle.

In the schematic illustration of Fig. 1 the vehicle consists of a chassis frame 10, or sprung mass, that is supported upon the axle structure 11, or unsprung mass of the vehicle, by means of the air springs 12. The air springs 12 are preferably expansible bellows type of units adapted to receive air under pressure sufficient to normally support the load of the chassis 10 upon the axle structure 11. When the load in the sprung mass, that is chassis of the vehicle, is increased, air under pressure is supplied to the air springs 12 to offset the increase in load and thereby maintain the clearance height between the sprung mass and the unsprung mass at a relatively constant value. Similarly, when the load in the vehicle decreases, air is exhausted from the air springs 12 to again compensate for the loss of load to maintain the clearance height at the relatively constant value.

The clearance height between the sprung mass 10 and the unsprung mass 11 is regulated and established by means of an air control valve 15 that is carried on the chassis 10 of the vehicle. The control valve 15 is provided with an inlet valve member that connects with a source of reservoir pressure maintained in the reservoir 16, a line 17 connecting the reservoir with the control valve 15. Reservoir pressure of a predetermined value is maintained in the reservoir by operation of an air compressor (not shown) normally operated by the engine of the vehicle, the air under pressure being supplied through the line 18 to the reservoir 16.

The control valve 15 is connected with the air springs 12 by means of a supply line 19 through which air under pressure is supplied to the air springs when the air inlet valve in the control valve 15 is actuated by the linkage 20 connecting the valve 15 with the axle 11 of the vehicle. Thus, when the load in the vehicle increases tending to compress the air springs 12, the linkage 20 will operate the inlet valve member of the control valve 15 to supply additional air under pressure to the springs 12 and thereby compensate for the increase in load. Similarly, when the load decreases in the vehicle, the linkage 20 operates an exhaust valve member in the control valve 15 to allow air under pressure to exhaust through the line 21 and thereby maintain the clearance height between the sprung mass and the unsprung mass at a relatively constant value.

Control or regulating valves supplying air to an air spring and exhaust air therefrom in response to changes in clearance height between the sprung mass and the unsprung mass of the vehicle are relatively well known in the art, such valves being adapted to maintain one selected predetermined clearance height between the sprung mass and the unsprung mass of the vehicle.

However, the control valve 15 of this invention is constructed and arranged in a manner that it has two selective positions in which it can maintain clearance height values between the sprung mass and the unsprung mass that are different, depending upon the selective operating positions of the control valve. The control valve 15 of this invention is adapted to be under control of the operator of the vehicle so that the operator can selectively determine the clearance height to be established by the control valve.

As more particularly shown in Figs. 2 to 4, the control valve 15 consists of a body 25 having a chamber 26 that receives the operating mechanism of the control valve.

The valve body 25 is provided with an inlet port passage 27 that connects with the inlet pipe 17 which, in turn, is connected with the reservoir 16. The inlet port 27 has a control valve 28 that is of a conventional tire-valve type, the valve 28 normally remaining closed and preventing flow of air from the port 17 into the valve chamber 26. The valve 28 has a valve stem 29 adapted to be engaged by the valve operating member 30 to open the valve 28 when engaged by the member 30. The valve body 25 also has an exhaust port passage 31 that receives a valve member 32 that is of the conventional tire-type valve. This valve 32 is normally closed to prevent passage of air under pressure from the valve chamber 26 out into the exhaust port 31, the valve 32 having a valve stem 33 that has a head 34 engaged by the valve operating member 30 when it is moved in an upwardly direction as viewed in Fig. 3 to open the exhaust valve at this time.

The valve operating member 30 consists of a plate 35 having a cylinder portion 36 at one end thereof supported upon an oscillatable shaft 37, a sleeve of plastic material 38 being positioned between the cylinder 36 and the shaft 37. The shaft 37 is journaled in the body 25 for rotation, that is for oscillating rotation, the shaft carrying a pin 39 extending radially of the shaft through a slot 40 in the cylinder 36 and an aligned slot 41 in the sleeve 38. Thus, the valve operating member 30 is free for rotation on the shaft 37 within the limits established by the length of the slots 40 and 41 whereby the valve operating member 30 will have different radial positions relative to the operating shaft 37 when the opposite ends of the slots 40 and 41 engage opposite sides of the pin 39.

A port 42 is provided in the valve body 25 that connects with the line 19 to supply air under pressure to the air spring or through which air under pressure is exhausted from the air spring depending upon the operation of the valves 28 and 32 respectively.

The oscillatable shaft 37 extends exteriorly of the valve body 25 and has an overtravel mechanism 50 secured on the end thereof. This overtravel mechanism allows for a greater amount of movement between the body 10 and the axle 11 of the vehicle than is allowed internally of the valve mechanism for operating the valves 28 and 32, since the movement of the valves 28 and 32 is limited in extent, it is necessary that the large movements of the axle relative to the body be taken up by the overtravel mechanism 50.

The overtravel mechanism 50 consists of a body 51 having a cylinder bore 52 in which a piston 53 reciprocates. This piston 53 has its forward end engaging the radially disposed flat surface 54 on the extended end 55 of the shaft 37. The body of the overtravel mechanism 50 has attached thereto an actuating arm 56 that is a part of the linkage mechanism 20 for actuating the shaft 37 in opposite directions of rotation as the body 10 and the axle 11 of the vehicle move relative to one another.

From the foregoing description it will be apparent that when the overtravel mechanism 50 is oscillated by the linkage mechanism 20 on the vehicle, oscillation of the shaft 37 will result with the valve operating member 30 being moved upwardly or downwardly, as viewed in Figs. 2 and 3, depending upon the direction of rotation of the shaft 37 to open the inlet valve 28 on downward movement of the member 30 and open the exhaust valve 32 on upward movement of the member 30. These movements of the valves 28 and 32 will control the air pressure within the air spring 12 and thereby maintain a predetermined clearance height between the sprung mass and the unsprung mass of the vehicle. The downward movement of the arm 30 is limited by a stop member 95 and the upward movement of the member 30 is limited by the head of the stop member 96. Excess movement of the actuating arm 56 over and above the limit of movement allowed by the stops 95 and 96 will be taken by the overtravel mechanism 50.

The valve mechanism heretofore described is provided with an arrangement to normally position the valve control member in one position to maintain a normal and relatively low predetermined clearance height between the sprung mass and the unsprung mass of the vehicle. Under control of the operator of the vehicle, the valve mechanism is adapted to be operated to change the operating condition of the control valve so that an above-normal or higher predetermined clearance height will be established by the control valve and thereafter maintained by the control valve so long as the operator retains the shifting control mechanism in a position to establish the new and higher selective clearance height.

As shown in Fig. 2, a compression spring 60 is provided between the lower side of the control member 30 and the body 25 of the valve. A second compression spring 61 is placed between the upper side of the control member 30 and a piston element 62 that operates in a cylinder 63 to compress the spring 61 against the action of the spring 60.

The springs 60 and 61 are of such values that normally the spring 60 takes precedence and urges the arm 30 in an upward position, as seen in Fig. 2, so that the right-hand end of the slot 40 is retained against the pin 39 in the shaft 37. Thus, the arm 30 is under this condition, normally biased to open the exhaust valve 32 by urging upward movement of the member 30. However, the air will be exhausted from the air spring only until such time as the vehicle moves downwardly toward the axle 11 until the actuating arm 56 rotates the shaft 37 clockwise to move the member 30 downwardly away from the head 34 of the exhaust valve 32 to close the same. If the load in the vehicle increases, the additional downward movement of the body of the vehicle relative to the axle 11 will then move the actuating member 30 downwardly against the head 29 of the valve 28 to open the inlet valve and allow air under pressure to flow to the air spring to counterbalance the increased load in the vehicle.

To set the valve into an operating condition for increasing the clearance height between the sprung mass and the unsprung mass to an above normal clearance height, a piston 70 operates in a cylinder 71 that is supplied with air through a port 72, a spring 76 normally holding the piston 70 in the upward position as shown in Fig. 2. Air under pressure is supplied to the cylinder 71 under control of the operator of the vehicle by way of operation of a suitable control valve so as to move the piston 70 downwardly with the plunger 73 moving the piston member 62 downwardly to compress the spring 61.

When this occurs the increased compression of the spring 61 overcomes the effect of the spring 60 so as to now urge the valve operating member 30 in a downward direction, that is, clockwise about the shaft 37 to cause the left-hand end of the slot 40 to engage the left-hand side of the pin 39. When this occurs the biasing of the arm 30 is then in a direction to open the inlet valve 28 to allow air under pressure to be supplied to the air springs until such time as the increased pressure raises the body of the vehicle to a new and higher predetermined clearance height value at which the control valve member 30 will then lift from the head of the valve 28.

While the embodiments of the present invention as herein disclosed constitute a preferred form, it is to be understood that other forms might be adopted.

What is claimed is as follows:

1. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to actuate said valve operating means, said valve operating means being carried on said shaft and rotatable thereon, means limiting rotation of said valve operating means in either direction on said shaft, and means to rotate said valve operating means from one radial position to another relative to said shaft to change the operating characteristics of the control valve to change the clearance height established and maintained thereby from one value to another.

2. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to actuate said valve operating means, said valve operating means being carried on said shaft and rotatable thereon, and stop means engageable by said valve operating means limiting the same to two positions of rotation in opposite direction relative to said shaft whereby to establish predetermined fixed values of radial relationship between said valve operating means and said shaft to establish and maintain fixed values of predetermined clearance height maintained thereby.

3. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to actuate said valve operating means, said valve operating means being carried on said shaft and rotatable thereon, movement limiting means between said shaft and said valve operating means limiting rotation of the valve operating means on said shaft to establish one radial position of said valve operating means relative to said shaft at one extreme of rotative movement of said valve operating means on said shaft and establish a second radial position of said valve operating means relative to said shaft at an opposite extreme of rotative movement of said valve operating means on said shaft, said radial positions of said valve operating means relative to said shaft establishing and maintaining clearance height of different values between the sprung mass and the unsprung mass of a vehicle.

4. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to actuate said valve operating means, said valve operating means being carried on said shaft and rotatable thereon, movement limiting means between said shaft and said valve operating means limiting rotation of the valve operating means on said shaft to establish one radial position of said valve operating means relative to said shaft at one extreme of rotative movement of said valve operating means on said shaft and establish a second radial position of said valve operating means relative to said shaft at an opposite extreme of rotative movement of said valve operating means on said shaft, means biasing said valve operating means to one of said radial positions normally to establish one predetermined clearance height between the sprung mass and the unsprung mass of the vehicle, and means changing the effect of the biasing means to bias the said valve operating means to the other of its said radial positions to thereby change the operating characteristics of the said control valve and change the clearance height between the sprung mass and the unsprung mass of the vehicle to that of a different value.

5. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to operate said valve operating means, said valve operating means being carried on said shaft and rotatable thereon, movement limiting means between said shaft and said valve operating means limiting rotation of the valve operating means on said shaft to establish one radial position of said valve operating means relative to said shaft at one extreme of rotative movement of said valve operating means on said shaft and establish a second radial position of said valve operating means relative to said shaft at an opposite extreme of rotative movement of said valve operating means on said shaft, oppositely acting spring means engaging said valve operating means normally biasing said valve operating means to one of its radial positions, and means operatively effective on said spring means to change the biasing effect of said spring means to rotate said valve operating means on said shaft to the other of its said radial positions and thereby change the clearance height between the sprung mass and the unsprung mass to a different value.

6. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to operate said valve operating means, said valve operating means being carried on said shaft and rotatable thereon, movement limiting means between said shaft and said valve operating means limiting rotation of the valve operating means on said shaft to two extreme opposite radial positions relative to said shaft, oppositely acting spring means engaging said valve operating means biasing the same in one direction of rotation to one of said extreme positions and normally biasing said valve operating means to open said exhaust valve means, and means operably effective on said spring means to change the biasing effect thereof to rotate said valve operating means in the opposite direction to position the same in the second of its extreme positions relative to said shaft and bias the said valve operating means to open said inlet valve means.

7. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means including an oscillatable shaft operated by a change in clearance height between the sprung mass and the unsprung mass of a vehicle to operate said valve operating means, said valve operating means including a sleeve carried on said shaft to support said valve operating means thereon for rotation on said shaft, a slot in said sleeve extending transversely thereof receiving a pin projecting radially from said shaft whereby cooperation of said slot and pin limits rotation of said sleeve on said shaft to two extreme positions at which said pin engages opposite ends of said slot and thereby establishes two different positions of said valve operating means relative to said shaft, and means engaging said valve operating means biasing the same into one of its radial positions, said means including additional means effective to change the biasing effect of the biasing means to rotate said valve operating means to the other of its radial positions and thereby change the clearance height between the sprung mass and the unsprung mass from one value to another.

8. Apparatus in accordance with claim 7 wherein the biasing means comprises oppositely acting spring means disposed on opposite sides of said valve operating means normally to bias the same to one of its radial positions relative to said shaft, and means operatively effective by the operator of the vehicle effective on said spring biasing means to change the biasing effect thereof to rotate said valve operating means on said shaft to the other of its extreme radial positions and thereby change the clearance height between the sprung mass and the unsprung mass of the vehicle.

References Cited in the file of this patent
UNITED STATES PATENTS

| | | |
|---|---|---|
| 1,087,305 | Lane | Feb. 17, 1914 |
| 1,188,609 | Beer | June 27, 1916 |
| 2,644,699 | Weiertz | July 7, 1953 |